(12) United States Patent
Gomes et al.

(10) Patent No.: US 10,157,217 B2
(45) Date of Patent: Dec. 18, 2018

(54) SYSTEMS AND METHODS FOR THE DISTRIBUTED CATEGORIZATION OF SOURCE DATA

(71) Applicant: California Institute of Technology, Pasadena, CA (US)

(72) Inventors: Ryan Gomes, Santa Monica, CA (US); Peter Welinder, San Diego, CA (US); Andreas Krause, Zurich (CH); Pietro Perona, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/166,598

(22) Filed: May 27, 2016

(65) Prior Publication Data

US 2016/0275173 A1   Sep. 22, 2016

Related U.S. Application Data

(63) Continuation of application No. 13/897,229, filed on May 17, 2013, now Pat. No. 9,355,167.

(60) Provisional application No. 61/648,965, filed on May 18, 2012, provisional application No. 61/663,138, filed on Jun. 22, 2012.

(51) Int. Cl.
*G06F 17/30* (2006.01)

(52) U.S. Cl.
CPC .. *G06F 17/30598* (2013.01); *G06F 17/30525* (2013.01)

(58) Field of Classification Search
USPC ................................................ 707/706, 737
See application file for complete search history.

(56) References Cited

U.S. PATENT DOCUMENTS

| 5,309,359 | A | 5/1994 | Katz et al. | |
|---|---|---|---|---|
| 6,636,843 | B2* | 10/2003 | Doddi | G02B 5/18 706/12 |
| 6,897,875 | B2* | 5/2005 | Zhang | G06F 19/26 345/587 |
| 7,610,130 | B1 | 10/2009 | Dixon | |

(Continued)

OTHER PUBLICATIONS

Antoniak, "Mixtures of Dirchlet Processes with Applications to Bayesian Nonparametric Problems", The Annals of Statistics, 1974, vol. 2, No. 6, pp. 1152-1174.

(Continued)

*Primary Examiner* — Kim T Nguyen
(74) *Attorney, Agent, or Firm* — KPPB LLP

(57) ABSTRACT

Systems and methods for the crowdsourced clustering of data items in accordance embodiments of the invention are disclosed. In one embodiment of the invention, a method for determining categories for a set of source data includes obtaining a set of source data, determining a plurality of subsets of the source data, where a subset of the source data includes a plurality of pieces of source data in the set of source data, generating a set of pairwise annotations for the pieces of source data in each subset of source data, clustering the set of source data into related subsets of source data based on the sets of pairwise labels for each subset of source data, and identifying a category for each related subset of source data based on the clusterings of source data and the source data metadata for the pieces of source data in the group of source data.

18 Claims, 5 Drawing Sheets

(56) References Cited

U.S. PATENT DOCUMENTS

| | | | |
|---|---|---|---|
| 7,809,722 | B2 | 10/2010 | Gokturk et al. |
| 7,987,186 | B1 | 7/2011 | Joshi |
| 8,041,568 | B2* | 10/2011 | Strope ............... G06Q 10/103 704/257 |
| 8,418,249 | B1 | 4/2013 | Nucci et al. |
| 8,706,729 | B2 | 4/2014 | Perona et al. |
| 8,818,793 | B1 | 8/2014 | Bangalore et al. |
| 8,849,648 | B1 | 9/2014 | Bangalore et al. |
| 9,239,848 | B2 | 1/2016 | Liu et al. |
| 9,311,599 | B1 | 4/2016 | Attenberg et al. |
| 9,344,466 | B1 | 5/2016 | Abuzalaf |
| 9,355,167 | B2 | 5/2016 | Gomes et al. |
| 9,355,359 | B2 | 5/2016 | Welinder et al. |
| 9,355,360 | B2 | 5/2016 | Welinder et al. |
| 9,483,794 | B2 | 11/2016 | Amtrup et al. |
| 9,704,106 | B2 | 7/2017 | Welinder et al. |
| 9,898,701 | B2 | 2/2018 | Welinder et al. |
| 9,928,278 | B2 | 3/2018 | Welinder et al. |
| 2004/0194021 | A1 | 9/2004 | Marshall et al. |
| 2004/0261016 | A1 | 12/2004 | Glass et al. |
| 2006/0129596 | A1 | 6/2006 | Bays |
| 2006/0288272 | A1 | 12/2006 | Kender et al. |
| 2007/0008321 | A1 | 1/2007 | Gallagher et al. |
| 2008/0005064 | A1 | 1/2008 | Sarukkai et al. |
| 2008/0016102 | A1 | 1/2008 | Albornoz |
| 2009/0307256 | A1 | 12/2009 | Tiyyagura |
| 2010/0023553 | A1 | 1/2010 | Gausman |
| 2010/0153318 | A1 | 6/2010 | Branavan et al. |
| 2011/0274334 | A1 | 11/2011 | Zhu |
| 2012/0158620 | A1 | 6/2012 | Paquet |
| 2012/0221508 | A1 | 8/2012 | Chaturvedi |
| 2013/0024457 | A1 | 1/2013 | Chua et al. |
| 2013/0031457 | A1 | 1/2013 | Griffiths et al. |
| 2013/0054636 | A1 | 2/2013 | Tang |
| 2013/0080422 | A1* | 3/2013 | Pan ............... G06Q 30/00 707/722 |
| 2013/0097164 | A1 | 4/2013 | Welinder et al. |
| 2013/0185049 | A1 | 7/2013 | Zhao et al. |
| 2013/0326325 | A1 | 12/2013 | De et al. |
| 2014/0188879 | A1 | 7/2014 | Welinder et al. |
| 2014/0289246 | A1* | 9/2014 | Gomes ............... G06F 17/30598 707/737 |
| 2014/0304270 | A1 | 10/2014 | Torkamani et al. |
| 2015/0011401 | A1* | 1/2015 | Davicioni ............... C12N 15/111 506/2 |
| 2015/0154284 | A1* | 6/2015 | Pfeifer ............... G06F 17/30657 707/723 |
| 2015/0356243 | A1* | 12/2015 | Andreassen ............... G06F 19/18 702/20 |
| 2016/0012050 | A1 | 1/2016 | Bursey et al. |
| 2016/0275417 | A1 | 9/2016 | Welinder et al. |
| 2016/0275418 | A1 | 9/2016 | Welinder et al. |
| 2017/0121763 | A1* | 5/2017 | Bram ............... C12Q 1/6858 |
| 2017/0293682 | A1* | 10/2017 | Pfeifer ............... G06F 17/30696 |

OTHER PUBLICATIONS

Attias, "A Variational Bayesian Framework for Graphical Models", NIPS, 1999, pp. 209-215.

Bennett, "Using Asymmetric Distributions to Improve Classifier Probabilities: A Comparison of New and Standard Parametric Meethods", Technical report, Carnegie Mellon University, 2002, 24 pgs.

Berg et al., "Automatic Attribute Discovery and Characterization from Noisy Web Data", Computer Vision—ECCV 2010, pp. 663-676.

Beygelzimer et al., "Importance Weighted Active Learning", Proceedings of the 26th International Conference on Machine Learning, 2009, 8 pgs.

Bitton, "Geometric Models for Collaborative Search and Filtering" 2011, 186 pgs.

Bourdev et al., "Poselets: Boyd Part Detectors Trained Using 3D Human Pose Annotations", ICCV, 2009, 42 pgs.

Byrd et al., "A Limited Memory Algorithm for Bound Constrained Optimization", SIAM Journal on Scientific and Statistical Computing, 1995, vol. 16, No. 5, pp. 1190-1208.

Cohn et al., "Active Learning with Statistical Models", Journal of Artificial Intelligence Research, 1996, vol. 4, pp. 129-145.

Dalal et al., "Histograms of Oriented Gradients for Human Detection", ICCV, 2005, 8 pgs.

Dankert et al., "Automated Monitoring and Analysis of Social Behavior in *Ddrosophila*", Nat. Methods, Apr. 2009, vol. 6, No. 4, 17 pgs.

Dasgupta et al., "Hierarchical Sampling for Active Learning", ICML, 2008, 8 pgs.

Dawid et al., "Maximum Likelihood Estimation of Observer Error-rates using the EM Algorithm", J. Roy. Statistical Society, Series C, 1979, vol. 28, No. 1, pp. 20-28.

Deng et al., "ImageNet: A Large-Scale Hierarchical Image Database", IEEE Computer Vision and Pattern Recognition, 2009, 8 pgs.

Dollar et al., "Cascaded Pose Regression", CVPR, 2010, pp. 1078-1085.

Dollar et al., "Pedestrian Detection: An Evaluation of the State of the Art", IEEE Transactions on Pattern Analysis and Machine Intelligence, 2011, 20 pgs.

Erkanli et al., "Bayesian semi-parametric ROC analysis", Statistics in Medicine, 2006, vol. 25, pp. 3905-3928.

Ertekin et al., "Learning to predict the wisdom of crowds", arXiv preprint arXiv:1204.3611 v1, Apr. 16, 2012, 8 Pages.

Ertekin et al., "Wisely Using a Budget for Crowdsourcing", OR 392-12. Massachusetts Institute of Technology, Apr. 2012, 31 pages.

Fei-Fei et al., "A Bayesian Hierarchical Model for Learning Natural Scene Categories", CVPR, IEEE Computer Society, 2005, pp. 524-531.

Frank et al., "UCI Machine Learning Repository", 2010, 3 pgs.

Fuchs et al., "Randomized tree ensembles for object detection in computational pathology", Lecture Notes in Computer Science, ISVC, 2009, vol. 5875, pp. 367-378.

Gionis et al., "Clustering Aggregation", ACM Transactions on Knowledge Discovery from Data, 2007. vol. 1, 30 pgs.

Gomes, et al., "Crowdclustering", Technical Report, Caltech 20110628-202526159, Jun. 2011, 14 pgs.

Gomes et al., "Crowdclustering", Technical Report, Caltech, 2011, pp. 558-561.

Gu et al, "Bayesian bootstrap estimation of ROC curve", Statistics in Medicine, 2008, vol. 27, pp. 5407-5420.

Hellmich et al., "Bayesian Approaches to Meta-analysis of ROC Curves", Med. Decis. Making, Jul.-Sep. 1999, vol. 19, pp. 252-264.

Jaakkola et al., "A variational approach to Bayesian logistic regression models and their extensions", Source unknown, Aug. 13, 1996, 10 pgs.

Kruskal, "Multidimensional Scaling by Optimizing Goodness of Fit to a Nonmetric Hypothesis", Psychometrika, Mar. 1964. vol. 29, No. 1, pp. 1-27.

Kurihara et al., "Accelerated Variational Dirichlet Process Mixtures", Advances in Neural Information Processing Systems, 2007, 8 pgs.

Li et al., "Solving consensus and Semi-supervised Clustering Problems Using Nonnegative Matrix Factorization", ICDM, IEEE computer society 2007. pp. 577-582.

Little et al., "Exploring Iterative and Parallel Human Computational Processes", HCOMP, 2010, pp. 68-76.

Little et al., "TurKit: Tools for Iterative Tasks on Mechanical Turk", HCOMP, 2009, pp. 29-30.

MacEachern et al., "Estimating Mixture of Dirichlet Process Models", Journal of Computational and Graphical Statistics, Jun. 1998, vol. 7, No. 2, pp. 223-238.

Mackay, "Information-Based Objective Functions for Active Data Selection", Neural Computation, 1992, vol. 4, pp. 590-604.

Martinez-Munoz et al., "Dictionary-Free Categorization of Very Similar Objects via Stacked Evidence Trees", Source unknown, 2009, 8 pgs.

Meila, "Comparing Clusterings by the Variation of Information", Learning theory and Kernel machines: 16th Annual Conference of Learning Theory and 7th Kernel Workshop, COLT/Kernel 2003, 31 pgs.

(56) References Cited

OTHER PUBLICATIONS

Monti et al., "Consensus Clustering: A Resampling-Based Method for Class Discovery and Visualization of Gene Expression Microarray Data", Machine Learning, 2003, vol. 52, pp. 91-118.
Neal, "MCMC Using Hamiltonian Dynamics", Handbook of Markov Chain Monte Carlo, 2010, pp. 113-162.
Nigam et al., "Text Classification from labeled and Unlabeled Documents Using EM", Machine Learning, 2000, vol. 39, No. 2/3, pp. 103-134.
Platt, "Probalisitic Outputs for Support Vector Machines and Comparisons to Regularized Likelihood Methods", Advances in Large Margin Classiers, 1999, MIT Press, pp. 61-74.
Raykar et al., "Supervised Learning from Multiple Experts: Whom to trust when everyone lies a bit", ICML, 2009, 8 pgs.
Russell et al., "LabelMe: a Database and Web-Based Tool for Image Annotation", Int. J. Comut. Vis., 2008, vol. 77, pp. 157-173.
Seeger, "Learning with labeled and unlabeled data", Technical Report, University of Edinburgh, 2002, 62 pgs.
Sheng et al., "Get Another Label? Improving Data Quality and Data Mining Using Multiple, Noisy Labelers", KDD, 2008, 9 pgs.
Smyth et al., "Inferring Ground Truth from Subjective Labelling of Venus Images", NIPS, 1995, 8 pgs.
Snow et al., "Cheap and Fast—But is it Good? Evaluating Non-Expert Annotations for Natural Language Tasks", EMNLP, 2008, 10 pgs.
Sorokin et al., "Utility data annotation with Amazon Mechanical Turk", First IEEE Workshop on Internet Vision at CVPR '08, 2008, 8 pgs.
Spain et al., "Some objects are more equal than others: measuring and predicting importance", ECCV, 2008, 14 pgs.
Strehl et al., "Cluster Ensembles—A Knowledge Reuse Framework for Combining Multiple Partitions", Journal of Machine Learning Research, 2002, vol. 3, pp. 583-617.
Tong et al, "Support Vector Machine Active Learning with Applications to Text Classification", Journal of Machine Learning Research, 2001, pp. 45-66.
Vijayanarasimhan et al, "Large-Scale Live Active Learning: Training Object Detectors with Crawled Data and Crowds", CVPR, 2001, pp. 1449-1456.
Vijayanarasimhan et al., "What's It Going to Cost You?: Predicting Effort vs. Informataiveness for Multi-Label Image Annotations", CVPR, 2009, pp. 2262-2269.
Von Ahn et al., "Labeling Images with a Computer Game", SIGCHI conference on Human factors in computing systems, 2004, pp. 319-326.
Von Ahn et al., "reCAPTCHA: Human-Based Character Recognition via Web Security Measures", Science, 2008, vol. 321, No. 5895, pp. 1465-1468.
Vondrick et al, "Efficiently Scaling up Video Annotation with Ccrowdsourced Marketplaces", ECCV, 2010, pp. 610-623.
Welinder et al., "Caltech-UCSD Birds 200", Technical Report CNS-TR-2010-001, 2001, 15 pgs.
Welinder et al., "Online crowdsourcing: rating annotators and obtaining cost-effective labels", IEEE Conference on Computer Vision and Pattern Recognition Workshops (ACVHL), 2010, pp. 25-32.
Welinder et al., "The Multidimensional Wisdom of Crowds", Neural Information Processing Systems Conference (HIPS), 2010, pp. 1-9.
Whitehill et al, "Whose Vote Should Count More: Optimal Integration of Labels from Labelers of Unknown Expertise", NIPS, 2009, 9 pgs.
Zhao et al., "Robust Active Learning Using Crowdsourced Annotations for Activity Recognition", In Human Computation: Papers from the 2011 AIII Workshop., Jan. 2011, pp. 74-79.
Zhu, "Semi-Supervised Learning Literature Survey", Technical report, University of Wisconsin—Madison, 2008, 60 pgs.
Biederman et al., "Sexing Day-Old Chicks: A Case Study and Expert Systems Analysis of a Difficult Perceptual-Learning Task", Journal of Experimental Psychology: Learning, Memory and Cognition, Oct. 1, 1987, vol. 13, No. 4, pp. 640-645.
Branson et al., "High-throughput ethomics in large groups of *Drosophila*", Nature Methods 6, 451-457, doi:10.1038/nmeth.1328 (May 3, 2009).
Carlson et al., "Toward an Architecture for Never-Ending Language Learning", in AAAI, Jul. 10, 2010, 8 pgs.
Dempster et al., "Maximum likelihood from Incomplete Data via the EM Algorithm", Journal of the Royal statistical Society, Series B (Methodological, Dec. 8, 1976, vol. 39, No. 1, pp. 1-38.
Everingham et al., "The Pascal Visual Object Classes (VOC) Challenge", International Journal of computer Vision, Jun. 1, 2010, vol. 88, No. 2, pp. 303-338.
Fei-Fei et al., "Learning Generative Visual Models from Few Training Examples: An Incremental bayesian Approach Tested on 101 Object Categories", Computer Vision and Image Understanding, Apr. 1, 2007, 9 pgs.
Fergus et al., "Object Class Recognition by Unsuperevised Scale-Invariant Learning", in CVPR, vol. 2, Jun. 18, 2003, pp. 264-271.
Fuchs et al., "Weakly Supervised Cell Nuclei Detection and Segmentation on Tissue Microarrays of Renal Clear Cell Carcinoma", DAGM 2008, LNCS 5096, Jun. 10, 2008, pp. 173-182.
Howe, "The Rise of Crowdsourcing", WIRED, Jun. 1, 2006, 16 pgs.
Lampert et al., "Learning to Detect Unseen Object Classes by Between-Class Attribute Transfer", 2009 IEEE Conference on Computer Vision and Pattern Recognition, Jun. 20-25, 2009, pp. 951-958.
Lo, "On a Class of Bayesian Nonparametric Estimates: I. Density Estimates", The Annals of Statistics, Mar. 1, 1984, vol. 12, No. 1, pp. 351-357.
Lowe, "Distinctive Image Features from Scale-Invariant Keypoints", Retrieved from: https://www.robots.ox.ac.uk/~vgg/research/affine/det_eval_files/lowe_ijcv2004.pdf, Jan. 5, 2004, Accepted for publication in the International Journal of Computer Vision, 2004, 28 pgs.
Navalapkkam et al., "Homo economicus in visual search", Journal of Vision, Jan. 23, 2009, 9(1):31, pp. 1-16.
Sutskever et al., "Modelling Relational Data Using Bayesian Clustered Tensor Factorization", Advances in Neural Information Processing Systems (NIPS), Jan. 1, 2009, 8 pgs.
Viola et al., "Robust Real-Time Face Detection", IJCV, May 1, 2004, Printed from: http://www.vision.caltech.edu/html-files/EE148-2005-Spring/pprs/viola04ijcv.pdf.
Wald, "Sequential Tests of Statistical Hypotheses", Ann. Math. Statist, Jun. 1, 1945, vol. 16, No. 2, pp. 117-186.
Wickens, "Elementary Signal Detection Theory", Oxford University Press, Oct. 11, 2001, 20 pgs.
Yuen et al., "LabelMe video: Builiding a Video Database with Human Annotations", in ICCV, Sep. 1, 2009, 8 pgs.
Agrawal et al., "Analyzing the performance of multilayer neural networks for object recognition", in European Conference on Computer Vision, 2014, arXiv: 1407.1610, Sep. 22, 2014, 21 pgs.
Biswas et al., "Simultaneous Active Learning of Classifiers & Attributes via Relative Feedback", in Proceedings of the IEEE Conference on Computer Vision and Pattern Recognition, pp. 644-651.
Branson et al., "Lean Crowdsourcing: Combining Human and Machines in an Online System", in Proceedings of the IEEE Conference on Computer Vision and Pattern Recognition, Jul. 2017, pp. 7474-7483.
Branson et al., "Visual recognition with humans in the loop", in European Conference on Computer Vision, 2010, Springer, 14 pgs.
Chilton et al., "Cascade: Crowdsourcing Taxonomy Creation", in Proceedings of the SIGCHI Conference on Human Factors in Computing Systems, ACM, Apr. 2013, 10 pgs.
Cox, "The Optimal Number of Response Alternatives for a Scale: A Review" Journal of Marketing Research, vol. 17, No. 4, Nov. 1980, 17 pgs.
Dalvi et al., "Aggregating crowdsourced binary ratings", in Proceedings of the 22nd international Conference on World Wide Web, ACM, 2013, pp. 285-294.
Deng et al., "Fine-Grained Crowdsourcing for Fine-Grained Recognition", in Proceedings of the IEEE Conference on Computer Vision and Pattern Recognition, 2013, 8 pgs.

(56) References Cited

OTHER PUBLICATIONS

Deng et al., "Hedging Your Bets: Optimizing Accuracy-Specificity Trade-offs in Large Scale Visual Recognition", Computer Vision and Pattern Recognition (CVPR), 2012 IEEE Conference on Jun. 16-21, 2012, 8 pgs.
Deng et al., "ImageNet: A Large-Scale Hierarchical Image Database", 2009 IEEE Conference on Computer Vision and Pattern Recognition, Jun. 20-25, 2009, 8 pgs.
Deng et al., "Scalable multi-label Annotation", in Proceedings of the SIGCHI Conference on Human Factors in Computing Systems, ACM, 2014, 4 pgs.
Erlenkotter, "A dual-based procedure for uncapacitated facility location", Operations Research, Dec. 1978, vol. 25, No. 6, pp. 992-1009.
Ghosh et al., "Who Moderates the Moderators? Crowdsourcing Abuse Detection in User-Generated Content", in Proceedings of the 12th ACM Conference on Electronic Commerce, ACM 2011, 12 pgs.
Gurari et al., "How to Collect Segmentations for Biomedical Images: A Benchmark Evaluating the Performance of Experts, Crowdsourced Non-Experts, and Algorithms", in 2015 IEEE Winter Conference on Applications of Computer Vision, 2015, 8 pgs.
Hall et al., "Fine-Grained Classification of Pedestrians in Video: Benchmark and State of the Art", in Proceedings of the IEEE Conference on Computer Vision and Pattern Recognition, 2015, pp. 5482-5491.
He et al., "Deep Residual Learning for Image Recognition", Computer Vision and Pattern Recognition, Dec. 10, 2015, retrieved from https://arxiv.org/abs/1512.03385, 12 pgs.
Hua et al., "Collaborative Active Learning of a Kernel Machine Ensemble for Recognition", in Proceedings of the IEEE International Conference on Computer Vision, 2013, pp. 1209-1216.
Huang et al., "Densely Connected Convolutional Networks", in Proceedings of the IEEE Conference on Computer Vision and Pattern Recognition, 2017, pp. 4700-4708.
Jain et al., "Active Image Segmentation Propagation", Computer Vision Foundation, 2016, 10 pgs.
Jain et al., "Predicting Sufficient Annotation Strength for Interactive Foreground Segmentation", in Proceedings of the IEEE International Conference on Computer Vision, 2013, 8 pgs.
Jin et al., "Learning with Multiple Labels", in Advances in Neural Information Processing Systems, 2002, 8 pgs.
Karger et al., "Budget-optimal task allocation for reliable crowdsourcing systems", Operations Research, Feb. 24, 2014, vol. 62, No. 1, pp. 1-24.
Karger et al., "Efficient Crowdsourcing for Multi-Class Labeling", ACM Sigmetrics Performance Evaluation Review, 2013, vol. 41, No. 1, 12 pgs.
Karger et al., "Iterative Learning for Reliable Crowdsourcing Systems", in Advances in Neural Information Processing Systems, Sep. 2012, 9 pgs.
Kazamzadeh et al., "ReferItGame: referring to Objects in Photographs of Natural Scenes", Proceedings of the 2014 Conference on Empirical Methods in Natural Language Processing (EMNLP), Oct. 25-29, 2014, pp. 787-798.
Khodabandeh et al., "Discovering Human Interactions in Videos with Limited Data Labeling", in Proceedings of the IEEE Conference on Computer Vision and Pattern Recognition Workshops, Jun. 2015, pp. 9-18.
Kovashka et al., "Actively Selecting Annotations Among Objects and Attributes", Proceedings of the International Conference on Computer Vision (ICCV), 2011, 8 pgs.
Kovashka et al., "Crowdsourcing in Computer Vision", Computer Graphics and Vision, 2014, vol. 10, No. 3, 30 pgs., (presented in two parts).
Kovashka et al., "Crowdsourcing in Computer Vision", Computer Graphics and Vision, 2014, vol. 10, No. 3, 39 pgs., (presented in two parts).
Krizhevsky et al., "ImageNet classification with Deep Convolutional Neural Networks", in Advances in Neural Information Processing Systems, 2012, 9 pgs.
Lad et al., "Interactively Guiding Semi-Supervised Clustering via Attribute-based Explanations", in European Conference on Computer Vision, 2013, pp. 16 pgs.
Li et al., "Error Rate Analysis of Labeling by Crowdsourcing", in International Conference on Machine Learning 2013 Workshop, 2013, 19 pgs.
Likert, "A technique for the measurement of attitudes", Archives of Psychology, vol. 22, No. 140, Jun. 1932, 53 pgs.
Lin et al., "Microsoft COCO: Common Objects in Context", in European Conference on Computer Vision, 2014, 15 pgs.
Linacre, "Optimizing Rating Scale Category Effectiveness", Journal of Applied Measurement, vol. 3, Issue 1, 2002, 12 pgs.
Littlestone et al., "The Weighted Majority Algorithm", Information and Computation, 1994, vol. 108, No. 2, pp. 212-261.
Liu et al., "Variational Inference for Crowdsourcing", in Advances in Neural Information Processing Systems (NIPS), Jul. 2012, 9 pgs.
Long et al., "Active Visual Recognition with Expertise Estimate in Crowdsourcing", IEEE International Conference on Computer Vision, Dec. 2013, pp. 3000-3007.
Long et al., "Multi-class Multi-annotator Active Learning with Robust Gaussian Process for Visual Recognition", in Proceedings of the IEEE International Conference on Computer Vision, 2015, pp. 2839-2847.
Maceachern, "Estimating normal means with a conjugate style dirichlet process prior", Communications in Statistics, Stimulation and Computation, vol. 23, Issue 3, 1994, pp. 727-741.
Mora et al., "How Many Species Are There on Earth and in the Ocean?" PLoS Biology, Aug. 2011, vol. 8, Issue 8, e1001127, 8 pgs.
Nagaraja et al., "Video Segmentation with Just a Few Strokes", in Proceedings of the IEEE International Conference on Computer Vision, 2015, 9 pgs.
Ok et al., "Optimality of Belief Propagation for Crowdsourced Classification", arXiv: 1602.03619, Mar. 10, 2016, 19 pgs.
Oquab et al., "Learning and Transferring Mid-Level Representations Using Convolutional Neural Networks", IEEE Conference on Computer Vision and Pattern Recognition, Jun. 2014, 11 pgs.
Pareto, "Cours d'economie politique", 1896, 430 pgs.
Parkash et al., "Attributes for Classifier Feedback", in European Conference on Computer Vision, Springer, 2012, 14 pgs.
Raykar et al., "Learning From Crowds", Journal of Machine Learning Research, Apr. 2010, vol. 11, pp. 1297-1322.
Rubinstein et al., "Annotation Propagation in Large Image Databases via Dense Image Correspondence", in European Conference on Computer Vision, Oct. 2012, 14 pgs.
Russakovsky et al., "Best of both worlds: human-machine collaboration for object annotation", in Proceedings of the IEEE Conference on Computer Vision and Pattern Recognition, 2015, pp. 2121-2131.
Shah et al., "Double or Nothing? Multiplicative Incentive Mechanisms for Crowdsourcing", in Advances in Neural Information Processing Systems, 2015, arXiv: 1408.1387, pp. 1-9.
Siddiquie et al., "Beyond Active Noun Tagging: Modeling Contextual Interactions for Multi-Class Active Learning", 2010 IEEE Conference on Computer Vision and Pattern Recognition (CVPR), 9 pgs.
Sullivan et al., "The eBird enterprise: An integrated approach to development and application of citizen science", Biological Conservation, Jan. 2014, vol. 169, pp. 31-40.
Szegedy et al., "Going deeper with convolutions", 2015 IEEE Conference on Computer Vision and Pattern Recognition (CVPR), Jun. 7-12, 2015, pp. 1-9.
Szegedy et al., "Rethinking the Inception Architecture for Computer Vision", Computer Vision and Pattern Recognition, Dec. 11, 2015, retrieved from https://arxiv.org/abs/1512.00567, 10 pgs.
Tian et al., "Max-Margin Majority Voting for Learning from Crowds", in Advances in Neural Information Processing Systems, 2015m, 9 pgs.
Ueda, "iNaturalist Research-grade Observations via GBIF.org", https://doi.org/10.15468/ab35x, 2017, 5 pgs.

(56) References Cited

OTHER PUBLICATIONS

Van Horn et al., "Building a bird recognition app and large scale dataset with citizen scientists: the fine print in fine-grained dataset collection", in Proceedings of the IEEE Conference on Computer Vision and Pattern Recognition, Jun. 2015, pp. 595-604.
Van Horn et al., "Lean Multiclass Crowdsourcing", CVPR 2018 Submission #1324, 10 pgs.
Vempaty et al., "Reliable Crowdsourcing for Multi-Class Labeling Using Coding Theory", IEEE Journal of Selected Topics in Signal Processing, Jan. 22, 2014, vol. 8, No. 4, 20 pgs.
Vijayanarasimhan et al, "Multi-Level Active Prediction of Useful Image Annotations for Recognition", in Advances in Neural Information Processing Systems, Dec. 2009, 8 pgs.
Von Ahn et al., "ESP: Labeling Images with a Computer Game", in AAAI Spring Symposium: Knowledge Collection from Volunteer Contributors, 2005, vol. 2, 8 pgs.
Vondrick et al., "Efficiently Scaling Up Crowdsourced Video Annotation", International Journal of Computer Vision, 2013, vol. 101, No. 1, published online Sep. 5, 2012, 21 pgs.
Wah et al., "Multiclass recognition and part localization with humans in the loop", in 2011 International Conference on Computer Vision, 2011, 8 pgs.
Wah et al., "Similarity Comparisons for Interactive Fine-Grained Categorization", in Proceedings of the IEEE Conference on Computer Vision and Pattern Recognition, Jun. 2014, 8 pgs.
Wah et al., "The Caltech-UCSD birds-200-2011 dataset" 8 pgs.
Wang et al., "Quality-based pricing for crowdsourced workers", NYU Stern Research Working Paper, CBA-13-06, Jun. 12, 2013, 46 pgs.
Wilber et al., "Cost-effective HITs for relative similarity comparisons", in Second AAAI Conference on Human Computation and Crowdsourcing, Apr. 12, 2014, arXiv:1404.3291, 7 pgs.
Yao et al., "Interactive object detection", in 2012 Conference on Computer Vision and Pattern Recognition (CVPR), Jun. 2012, 8 pgs.
Yosinski et al., "How transferable are features in deep neural networks?", in Advances in Neural Information Processing Systems, Nov. 6, 2014, vol. 27, pp. 3320-3328, arXiv:1411.1792, 14 pgs.
Zhang et al., "Multi-class ground truth inference in crowdsourcing with clustering", IEEE Transactions on Knowledge and Data Engineering, Apr. 2016, vol. 28, No. 4, pp. 1080-1085.
Zhang et al., "Spectral Methods Meet EM: A Provably Optimal Algorithm for Crowdsourcing", in Advances in Neural Information Processing Systems, Nov. 1, 2014, arXiv: 1406.3824, 39 pgs.
Zhou et al., "Aggregating Ordinal Labels from Crowds by Mimimax Conditional Entropy", in Proceedings of the 31st International Conference on Machine Learning, Jun. 2014, 9 pgs.
Zhou et al., "Learning from the Wisdom of Crowds by Minimax Entropy", in Advances in Neural Information Processing Systems, Dec. 2012, 9 pgs.

\* cited by examiner

US 10,157,217 B2

SYSTEMS AND METHODS FOR THE DISTRIBUTED CATEGORIZATION OF SOURCE DATA

CROSS-REFERENCE TO RELATED APPLICATIONS

The current application is a continuation of U.S. patent application Ser. No. 13/897,229, filed May 17, 2013 and issued as U.S. Pat. No. 9,355,167 on May 31, 2016, which claims priority to U.S. Provisional Patent Application No. 61/648,965, titled "Crowdclustering" to Gomes et al. and filed May 18, 2012 and U.S. Provisional Patent Application No. 61/663,138, titled "Method for Combining Human and Machine Computation for Classification and Regression Tasks" to Welinder et al. and filed Jun. 22, 2012, the disclosures of which are hereby incorporated by reference in their entirety.

FEDERAL FUNDING SUPPORT

This invention was made with government support under N00014-06-1-0734, N00014-10-1-0933 (UCLA.MURI Sub 1015 G NA127), and N00173-09-C-4005 awarded by the Office of Naval Research along with government support under IIS0413312 awarded by the National Science Foundation. The government has certain rights in the invention.

FIELD OF THE INVENTION

The present invention is generally related to data c and more specifically the distributed categorization of sets of data.

BACKGROUND OF THE INVENTION

Amazon Mechanical Turk is a service provided by Amazon.com of Seattle, Wash. Amazon Mechanical Turk provides the ability to submit tasks and have a human complete the task in exchange for a monetary reward for completing the task.

SUMMARY OF THE INVENTION

Systems and methods for the crowdsourced clustering of data items in accordance embodiments of the invention are disclosed. In one embodiment of the invention, a method for determining categories for a set of source data includes obtaining a set of source data using a distributed data categorization server system, where a piece of source data includes source data metadata describing attributes of the piece of source data, determining a plurality of subsets of the source data using the distributed data categorization server system, where a subset of the source data includes a plurality of pieces of source data in the set of source data, generating a set of pairwise annotations for the pieces of source data in each subset of source data using the distributed data categorization server system, where a pairwise annotation indicates when a first piece of source data in a pair of pieces of source data in the subset of source data is similar to a second piece of source data in the pair of pieces of source data, clustering the set of source data into related subsets of source data based on the sets of pairwise labels for each subset of source data using the distributed data categorization server system, and identifying a category for each related subset of source data based on the clusterings of source data and the source data metadata for the pieces of source data in the group of source data using the distributed data categorization server system.

In another embodiment of the invention, determining categories for a set of source data further includes generating a taxonomy based on the identified categories and the set of source data using the distributed data categorization server system, where the taxonomy includes relationships between the identified categories and the pieces of source data in the set of source data.

In an additional embodiment of the invention, a category in the taxonomy includes one or more attributes of the pieces of source data associated with the category in the taxonomy.

In yet another additional embodiment of the invention, determining categories for a set of source data further includes iteratively identifying sub-categories for at least one identified category based on the pieces of source data associated with the identified category using the distributed data categorization server system.

In still another additional embodiment of the invention, the at least one identified category is selected based on the attributes of the pieces of source data associated with the identified category and the identified sub-categories include at least one attribute from a piece of source data associated with the sub-category that is not present in the identified category.

In yet still another additional embodiment of the invention, determining categories for a set of source data further includes generating instruction data using the distributed data categorization server system, where the instruction data describes the attributes of the pieces of the source data that should be used in generating the set of pairwise annotations.

In yet another embodiment of the invention, the instruction data is generated based on the attributes of the pieces of source data in the set of source data.

In still another embodiment of the invention, generating a set of pairwise annotations for the pieces of source data in each subset of source data using the distributed data categorization server system is based on data characterization device metadata, where the data characterization device metadata describes anticipated annotations based on the pieces of source data.

In yet still another embodiment of the invention, clustering the set of source data into related subsets of source data further includes generating a model including a set of points representing the pieces of source data in a Euclidian space using the distributed data categorization server system and clustering the set of points within the Euclidian space based on the set of pairwise annotations using the distributed data categorization server system.

In yet another additional embodiment of the invention, determining categories for a set of source data further includes estimating the number of clusters within the Euclidian space using the distributed data categorization server system.

In still another additional embodiment of the invention, determining a plurality of subsets further includes determining a subset size using the distributed data categorization server system, where the subset size is a measure of the number of pieces of source data assigned to a subset and deterministically allocating the pieces of source data to the determined subsets using the distributed data categorization server system.

In yet still another additional embodiment of the invention, determining categories for a set of source data further includes allocating additional pieces of source data to the subsets using the distributed data categorization server system, where the additional pieces of source data are sampled without replacement from the set of source data not already assigned to the subset.

Still another embodiment of the invention includes a distributed data categorization server system including a processor and a memory configured to store a data categorization application, wherein the data categorization application configures the processor to obtain a set of source data, where a piece of source data includes source data metadata describing attributes of the piece of source data, determine a plurality of subsets of the source data, where a subset of the source data includes a plurality of pieces of source data in the set of source data, generate a set of pairwise annotations for the pieces of source data in each subset of source data, where a pairwise annotation indicates when a first piece of source data in a pair of pieces of source data in the subset of source data is similar to a second piece of source data in the pair of pieces of source data, cluster the set of source data into related subsets of source data based on the sets of pairwise labels for each subset of source data, and identify a category for each related subset of source data based on the clusterings of source data and the source data metadata for the pieces of source data in the group of source data.

In yet another additional embodiment of the invention, the data categorization application further configures the processor to generate a taxonomy based on the identified categories and the set of source data, where the taxonomy includes relationships between the identified categories and the pieces of source data in the set of source data.

In still another additional embodiment of the invention, a category in the taxonomy includes one or more attributes of the pieces of source data associated with the category in the taxonomy.

In yet still another additional embodiment of the invention, the data categorization application further configures the processor to iteratively identify sub-categories for at least one identified category based on the pieces of source data associated with the identified category.

In yet another embodiment of the invention, the at least one identified category is selected based on the attributes of the pieces of source data associated with the identified category and the identified sub-categories include at least one attribute from a piece of source data associated with the sub-category that is not present in the identified category.

In still another embodiment of the invention, the data categorization application further configures the processor to generate instruction data, where the instruction data describes the attributes of the pieces of the source data that should be used in generating the set of pairwise annotations.

In yet still another embodiment of the invention, the instruction data is generated based on the attributes of the pieces of source data in the set of source data.

In yet another additional embodiment of the invention, generating a set of pairwise annotations for the pieces of source data in each subset of source data using the distributed data categorization server system is based on data characterization device metadata, where the data characterization device metadata describes anticipated annotations based on the pieces of source data.

In still another additional embodiment of the invention, the data categorization application further configures the processor to cluster the set of source data into related subsets of source data by generating a model including a set of points representing the pieces of source data in a Euclidian space and clustering the set of points within the Euclidian space based on the set of pairwise annotations.

In yet still another additional embodiment of the invention, the data categorization application further configures the processor to estimate the number of clusters within the Euclidian space.

In yet another additional embodiment of the invention, the data categorization application further configures the process to determine a plurality of subsets by determining a subset size, where the subset size is a measure of the number of pieces of source data assigned to a subset and deterministically allocating the pieces of source data to the determined subsets.

In still another additional embodiment of the invention, the data categorization application further configures the processor to allocate additional pieces of source data to the subsets, where the additional pieces of source data are sampled without replacement from the set of source data not already assigned to the subset.

DETAILED DESCRIPTION

Figure 1:
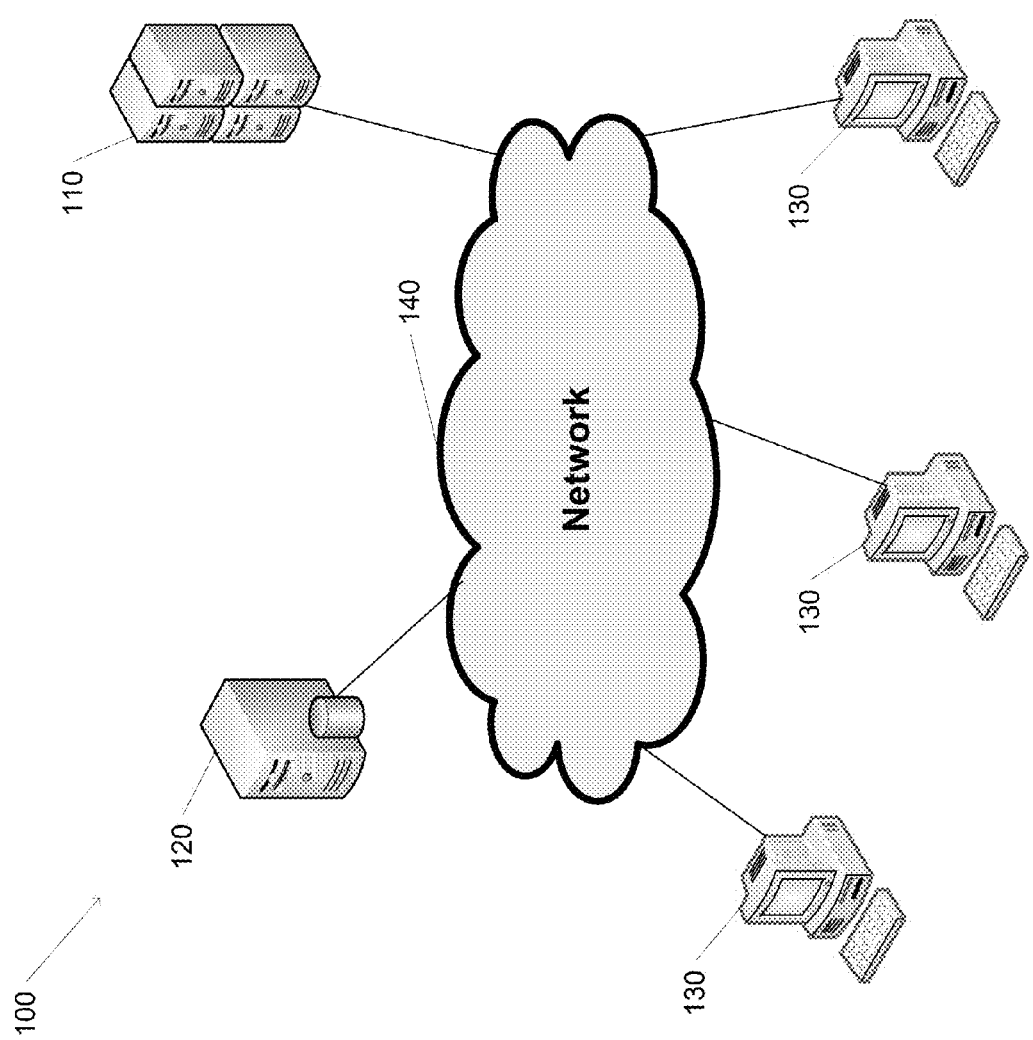
FIG. 1 conceptually illustrates a distributed data categorization system in accordance with an embodiment of the invention.

Turning now to the drawings, systems and methods for distributed categorization of source data in accordance with embodiments of the invention are illustrated. In a variety of applications including, but not limited to, medical diagnosis, surveillance verification, performing data de-duplication, transcribing audio recordings, or researching data details, a large variety of source data, such as image data, audio data, and text data, can be generated and/or obtained. By categorizing these pieces of source data, particular portions of the source data can be identified for particular purposes and/or additional analysis. Systems and methods for annotating source data that can be utilized in accordance with embodiments of the invention are disclosed in U.S. patent application Ser. No. 13/651,108, titled "Systems and Methods for Distributed Data Annotation" to Welinder et al. and filed Oct. 12, 2012, the entirety of which is hereby incorporated by reference. However, particularly in applications having a large number of source data, determining what categories are present in the source data can be difficult. It may not be realistic to expect a single person or machine to look at all images and determine categories for the set of source data, as it may not be time and/or cost effective to have a single source of categorizations. Likewise, a single person or machine may not be able to identify every category present within the set of source data. Additionally, individual sources of category annotations, whether untrained sources or expert sources, might not agree on the criteria used to define categories and may not even agree on the number of categories that are present within the set of source data.

Distributed data categorization server systems in accordance with embodiments of the invention are configured to determine subsets of a set of source data and distribute the subsets of source data to a variety of data categorization devices that are configured to identify clusters containing similar source data within the subsets and annotate the pieces of source data with the identified cluster information. Data categorization devices include human annotators, machine-based categorization devices, and/or a combination of machine and human categorization as appropriate to the requirements of specific applications in accordance with embodiments of the invention. The data categorization devices are configured to cluster subsets of source data based on a variety of categorization criteria, where the source data in a cluster belong to the same category according to the categorization criteria. In several embodiments, the clustering of data is a human intelligence task where human annotators are asked to pick pairs of source data that they consider to be most similar from a set of examples of source data. As can readily be appreciated, annotators can utilize any of a variety of characteristics of the source data to define similarly. For example, one annotator may cluster images of objects based upon color and another annotator may cluster the same images based on shape. The different characteristics utilized during annotation are typically unknown to the distributed data categorization and so analysis of the clusters reveals different attributes of the source data and semantic information concerning the manner in which the source data can be categorized. Furthermore, aggregation of information across a number of annotators can capture information concerning different useful ways in which users may categorize source data. In this way, source data can be annotated using in the ways that are most meaningful to users instead of being restricted to annotation in accordance with a predefined taxonomy. In a variety of embodiments, instruction data is provided along with the subsets of source data indicating the attributes of the pieces of source data that should be analyzed in the clustering of the pieces of source data. The distributed data categorization server system is configured to receive the different clusters of source data from a variety of data categorization devices and identify categories within the set of source data based on the annotations associated with the source data. The categories can be defined using the attributes of the pieces of source data as appropriate to the requirements of specific applications in accordance with embodiments of the invention. In a variety of embodiments, the distributed data categorization server system is configured to determine metadata describing the characteristics of the data categorization devices based on the received annotated pieces of source data. This data categorization device metadata describes the annotations received from the data categorization device and can be utilized to anticipate annotations provided by the data categorization device, in the determination of which data categorization devices to distribute subsets of source data, and in the calculation of rewards (such as monetary compensation) to allocate to particular data categorization devices.

In many embodiments, the distributed data categorization server system is configured to identify categories that may contain additional sub-categories and distribute those source data associated with an identified category for additional clustering by the data categorization devices. In this way, broad categories can be identified for a set of source data and additional categories can be iteratively identified within the source data. In a number of embodiments, the iterative categorization of source data is utilized to construct a taxonomy (or any other structure representing entities and the relationships between the entities) where the categories and sub-categories describe the relationships between the pieces of source data in the set of source data. As additional sub-categories are iteratively identified within subsets of the set of source data, additional relationships between the identified categories, sub-categories, and pieces of source data are incorporated into the taxonomy. Although specific taxonomy-based approaches for expressing the relationships between categories and source data with increased specificity are discussed above, any of a variety of techniques can be utilized to categorize source data including techniques that involve a single pass or multiple passes by the same set of data categorization devices or different sets of data categorization devices as appropriate to the requirements of specific applications in accordance with embodiments of the invention.

Although the above is described with respect to distributed data categorization server systems and data categorization devices, the data categorization devices can be implemented using the distributed data categorization server system as appropriate to the requirements of specific applications in accordance with embodiments of the invention. Systems and methods for distributed categorization of source data in accordance with embodiments of the invention are discussed further below.

Distributed Data Categorization Systems

Distributed data categorization systems in accordance with embodiments of the invention are configured to distribute subsets of a set of source data to a variety of data categorization devices and, based on the results obtained from the data categorization devices, identify categories of source data within the set of source data. A conceptual illustration of a distributed data categorization system in accordance with an embodiment of the invention is shown in FIG. 1. Distributed data categorization system 100 includes distributed data categorization server system 110 connected to source data database 120 and one or more data categorization devices 130 via network 140. In many embodiments, distributed data categorization server system 110 and/or source data database 120 are implemented using a single server. In a variety of embodiments, distributed data categorization server system 110 and/or source data database 120 are implemented using a plurality of servers. In many embodiments, data categorization devices 130 are implemented utilizing distributed data categorization server system 110 and/or source data database 120. Network 140 can be one or more of a variety of networks, including, but not limited to, wide-area networks, local area networks, and/or the Internet as appropriate to the requirements of specific applications in accordance with embodiments of the invention.

Distributed data categorization system 110 is configured to obtain pieces of source data and store the pieces of source data using source data database 120. Source data database 120 can obtain source data from any of a variety of sources, including content sources, customers, and any of a variety of providers of source data as appropriate to the requirements of specific applications in accordance with embodiments of the invention. In a variety of embodiments, source data database 120 includes one or more references (such as a uniform resource locator) to source data that is stored in a distributed fashion. Source data database 120 includes one or more sets of source data to be categorized using distributed data categorization server system 110. A set of source data includes one or more pieces of source data including, but not limited to, image data, audio data, signal data, and text data. In several embodiments, one or more pieces of source data in source data database 120 includes source data metadata describing attributes of the piece of source data. Distributed data categorization server system 110 is further configured to generate subsets of source data and distribute the subsets of source data to one or more data categorization devices 130. Data categorization devices 130 transmit annotated source data to distributed data categorization server system 110. Based on the annotated source data, distributed data categorization server system 110 is configured to identify categories describing the pieces of source data. In many embodiments, distributed data categorization server system 110 is configured to determine the characteristics of the data categorization devices 130 based on the received annotations. The characteristics of data categorization devices 130 can be utilized by distributed data categorization server system 110 to determine which data categorization devices 130 will receive pieces of source data and/or determine rewards (or other compensation) for annotating pieces of source data. In a number of embodiments, distributed data categorization server system 110 is configured to identify categories of source data that may contain additional sub-categories within the source data and (iteratively) distribute the identified categories of source data to data categorization devices 130 to identify additional sub-categories within the particular set of source data.

Data categorization devices 130 are configured to cluster pieces of source data according to categorization criteria and annotate the pieces of source data based on the clustering via metadata associated with the pieces of source data. Data categorization devices 130 include, but are not limited to, human annotators, machine annotators, and emulations of human annotators performed using machines. Human annotators can constitute any human-generated annotators, including users performing human intelligence tasks via a service such as the Amazon Mechanical Turk service provided by Amazon.com, Inc. In the illustrated embodiment, data categorization devices 130 are illustrated as personal computers configured using appropriate software. In various embodiments, data categorization devices can include (but are not limited to) tablet computers, mobile phone handsets, software running on distributed data categorization server system 110, and/or any of a variety of network-connected devices as appropriate to the requirements of specific applications in accordance with embodiments of the invention. In several embodiments, data categorization devices 130 provide a user interface and an input device configured to allow a user to view the pieces of source data received by the data categorization device and provide annotations (such as clustering pieces of source data based on similarity) for the pieces of source data. In a number of embodiments, a plurality of pieces of source data are presented to the user and the user is asked to select similar pieces of source data, such as via grouping pieces of source data and/or other selection techniques as appropriate to the requirements of specific applications in accordance with embodiments of the invention. In many embodiments, the user is asked to select the two most similar pieces of source data within the presented source data (e.g. the user selects pairs of pieces of source data based on categorization criteria). In this way, by presenting different sets of source data the user annotations can be utilized to identify clusters of related pieces of source data based on the pairwise relationships identified in the user annotations. In a variety of embodiments, the annotations are performed using distributed data categorization server system 110.

Distributed data categorization systems in accordance with embodiments of the invention are described above with respect to FIG. 1; however, any of a variety of distributed data categorization systems can be utilized in accordance with embodiments of the invention. Systems and methods for distributed data categorization in accordance with embodiments of the invention are described below.

Distributed Data Categorization Server Systems

Figure 2:
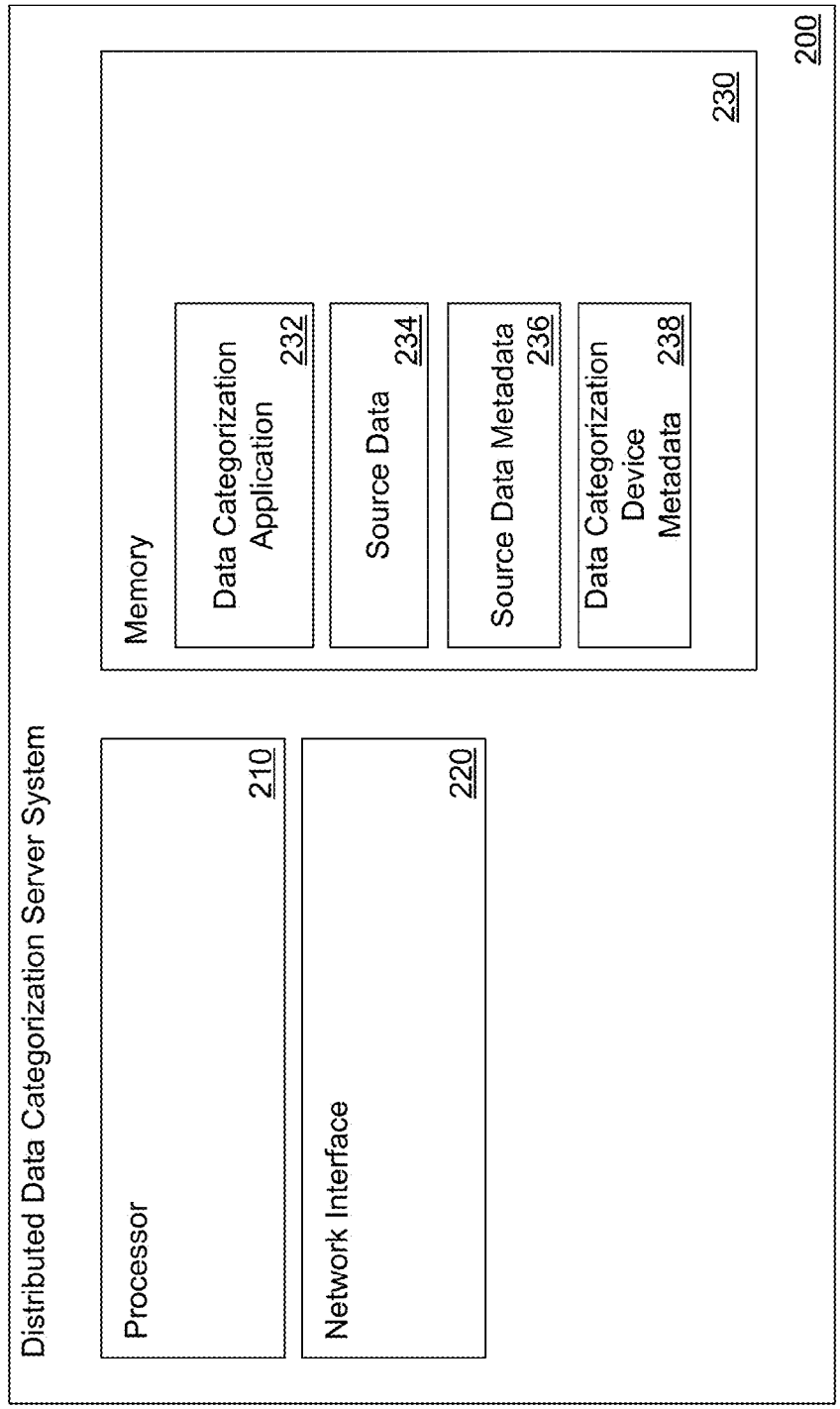
FIG. 2 conceptually illustrates a data categorization device in accordance with an embodiment of the invention.

Distributed data categorization server systems are configured to assign pieces of source data from a set of source data to data categorization devices, receive annotations identifying clusters of source data within the set of source data from the data categorization devices, and determine categories for the pieces of source data based on the received annotations. A distributed data categorization server system in accordance with an embodiment of the invention is conceptually illustrated in FIG. 2. Distributed data categorization server system 200 includes processor 210 in communication with memory 230. Distributed data categorization server system 200 also includes network interface 220 configured to send and receive data over a network connection. In a number of embodiments, network interface 220 is in communication with the processor 210 and/or memory 230. In several embodiments, memory 230 is any form of storage configured to store a variety of data, including, but not limited to, data categorization application 232, source data 234, source data metadata 236, and data categorization device metadata 238. In many embodiments, source data 234, source data metadata 236, and/or data categorization device metadata 238 are stored using an external server system and received by distributed data categorization server system 200 using network interface 220. External server systems in accordance with a variety of embodiments include, but are not limited to, database systems and other distributed storage services as appropriate to the requirements of specific applications in accordance with embodiments of the invention.

Data categorization application 232 configures processor 210 to perform a distributed data categorization process for set of source data 234. The distributed data categorization process includes generating subsets of the set of source data 234 and transmitting the subsets of source data to one or more data categorization devices. In a variety of embodiments, the subsets of source data are transmitted via network interface 220. In many embodiments, the selection of data categorization devices is based on data categorization device metadata 238. As described below, the data categorization devices are configured to generate clusters of pieces of source data and generate source data metadata 236 containing annotations and/or other attributes for the pieces of source data based on the generated clusters. Source data attributes can include, but are not limited to, annotations provided for the piece of source data, the source of the provided annotations, and/or one or more categories identified as describing the piece of source data. In a variety of embodiments, data categorization application 232 configures processor 210 to perform the clustering and annotation processes. The distributed data categorization process further includes receiving the annotated pieces of source data and identifying categories containing one or more pieces of source data 234 based on the annotations and/or other attributes in source data metadata 236. In a number of embodiments, the distributed data categorization process also includes identifying categories of source data that may contain additional sub-categories and iteratively performing the data categorization process on the identified categories to generate the sub-categories of source data.

In a number of embodiments, data categorization application 232 further configures processor 210 to generate and/or update data categorization device metadata 238 describing the characteristics of a data categorization device based on the pieces of source data provided to the data categorization device and/or the annotations generated by the data categorization device. Data categorization device metadata 238 can also be used to determine rewards and/or other compensation awarded to a data categorization device for providing annotations to one or more pieces of source data. Characteristics of a data categorization device include pieces of source data annotated by the data categorization device, the annotations applied to the pieces of source data, previous rewards granted to the data categorization device, the time spent annotating pieces of source data, demographic information, the location of the data categorization device, clustering criteria describing how the data categorization device clusters pieces of source data, and any other characteristic of the data categorization device as appropriate to the requirements of specific applications in accordance with embodiments of the invention.

Distributed data categorization server systems are described above with respect to FIG. 2; however, a variety of architectures, including those that store data or applications on disk or some other form of storage and are loaded into the memory at runtime can be utilized in accordance with embodiments of the invention. Processes for the distributed categorization of source data in accordance with embodiments of the invention are discussed further below.

Distributed Data Categorization

Figure 3:
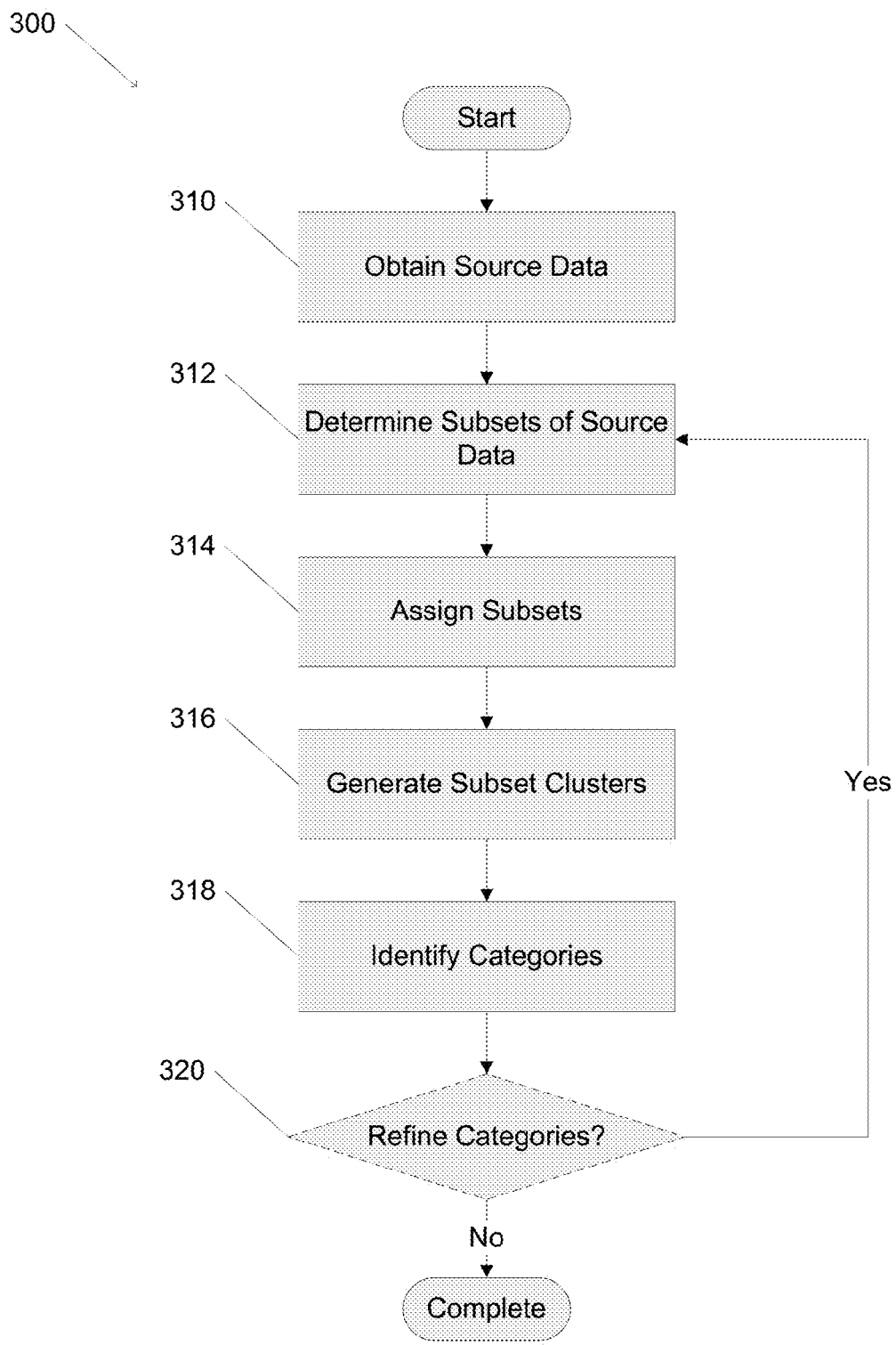
FIG. 3 is a flow chart conceptually illustrating a process for the categorization of source data in accordance with an embodiment of the invention.

The distributed categorization of source data involves the annotation of a set of source data by a number of data categorization devices. Using the annotations, categories describing the pieces of source data can be determined. These categories can be utilized to identify portions of the set of source data of interest for further analysis and/or category refinement. A process for distributed data categorization in accordance with an embodiment of the invention is illustrated in FIG. 3. The process 300 includes obtaining (310) a set of source data. Subsets of source data are determined (312) and assigned (314). Clusters within a subset of source data are generated (316). Categories of source data are identified (318). In many embodiments, if refinements to the categories are required (320), additional subsets of source data are determined (312).

In many embodiments, the obtained (310) source data contains one or more pieces of source data. The pieces of source data can be, but are not limited to, image data, audio data, video data, signal data, text data, or any other data appropriate to the requirements of specific applications in accordance with embodiments of the invention. The pieces of source data can include source data metadata describing attributes of the piece of source data. A variety of techniques can be utilized to determine (312) subsets of the source data as appropriate to the requirements of specific applications in accordance with embodiments of the invention, including determining overlapping subsets where every pair of pieces of source data occur in at least one subset, random sampling, and iterative sampling methods that adaptively choose maximally informative subsets. Additional processes for determining (312) subsets of source data that can be utilized in accordance with embodiments of the invention are described below. In a number of embodiments, determining (312) subsets of source data further includes generating instruction data describing how the source data should be clustered. The instruction data can be pre-determined and/or determined based on the attributes of the pieces of source data being provided. The determined (312) subsets are assigned (314) to one or more data categorization devices; a particular subset can be assigned to one or more data categorization devices. In a number of embodiments, a particular data categorization device can only provide one set of annotations for a particular subset of source data; other embodiments allow multiple annotations for a particular subset of source data by the same data categorization device. In several embodiments, the subsets are assigned (314) using data categorization device metadata describing the capabilities of the data categorization devices. In several embodiments, the capabilities of a data categorization are determined based on the received instruction data. In a variety of embodiments, a compensation value is associated with the assigned (314) subset; the compensation value can be pre-determined and/or determined dynamically based on the attributes of the source data, the instruction data, and/or the capabilities of the data categorization device.

Generating Subset Clusters

Subset clusters include one or more pieces of source data within an assigned (314) subset. Generating (316) clusters of source data includes associating pieces of source data based on the attributes of the source data, where pieces of source data in the same cluster have similar attributes. For example, pieces of source data can be clustered based on size, color, quantity, genre, location, or any other categorization criteria as appropriate to the requirements of specific applications in accordance with embodiments of the invention. The clusters can be generated (316) according to the instruction data and/or the capabilities of a data categorization device. In a variety of embodiments, the pieces of source data are annotated based on the differences between the generated (316) clusters; e.g. the data categorization device provides metadata describing the differences between the generated (316) clusters than can be utilized in identifying (318) categories based on the generated (316) clusters. In many embodiments, the generated (316) clusters are utilized to annotate the pieces of source data with binary pairwise labels for each pairing of pieces of source data within the assigned (314) subset such that each pair (a, b) of pieces of source data assigned (314) to a data categorization device j has a label $l_{abj}$ where $l_{abj}=1$ if the pieces of source data are in the same cluster and $l_{abj}=-1$ if the pieces of source data are in different clusters. In a number of embodiments, the annotations for the clusters of pieces of source data utilize pairwise distance and/or three-way comparisons between the pieces of source data. Other label values and labeling techniques can be utilized as appropriate to the requirements of specific applications in accordance with embodiments of the invention.

In several embodiments, the results of the generated (316) clusters are represented as a set of $$\binom{M}{2}$$

binary labels (e.g. the annotations applied to the pieces of source data), where there are N total pieces of source data (indexed by i) and M pieces of source data in a determined (312) subset of source data; H subsets are determined (312) (indexed by h). In general, M<N, and in a number of embodiments, M«N. The subsets of source data are assigned (314) to J data categorization devices (indexed by j). The annotations received from all of the data categorization devices is the set of binary variables $\mathcal{L}$ (indexed by $t \in \{1, \ldots, T\}$), where $$T = H\binom{M}{2}$$

is the total number of labels and $l_t$ is the t-th label in $\mathcal{L}$. Associated with $l_t$ is a quadruple $(a_t, b_t, j_t, h_t)$ where $j_t \in \{1, \ldots, J\}$ indicates the data categorization device producing the label, $a_t \in \{1, \ldots, N\}$ and $b_t \in \{1, \ldots, N\}$ indicate the two pieces of source data compared by the label, and $H_t \in \{1, \ldots, H\}$ indicates the subset and data categorization device combination that generated the label.

Identifying Categories

Once clusters of pieces of source data have been generated (316) for the set of source data, categories can be identified (318). In a variety of embodiments, the generated (316) cluster information is received by a distributed data categorization server system from a plurality of data categorization devices. Identifying (318) categories includes a number of indivisible groups that describe the generated (316) clusterings of pieces of source data across some or all of the subsets of source data. For example, suppose one data categorization device clusters objects into tall objects and another of short objects, while a second data categorization device clusters the same objects into a cluster of red objects and another of blue objects. Therefore, the identified (318) categories include tall red objects, short red objects, tall blue objects, and short blue objects.

In several embodiments, pieces of source data are represented as points in a Euclidian space and the data categorization devices are modeled as pairwise binary classifiers. Identifying (318) clusters is performed by clustering the source data points using a Dirichlet process mixture model, although a variety of discrete distributions can be utilized as appropriate to the requirements of specific applications in accordance with embodiments of the invention. Given a D dimensional vector $x_i$ with components $[x_i]_d$ that encode source data piece i in the Euclidian space $\mathbb{R}^D$. A pairwise binary classifier is defined using the symmetric matrix $W_j \in \mathbb{R}^{D \times D}$ with entries $[W_j]_{d_1 d_2}$ and bias $\tau_j \in \mathbb{R}^D$. The likelihood of a data categorization device to generate (316) a particular clustering for images $a_t$ and $b_t$ with label $l_t$ is $$p(l_t \mid x_{a_t}, x_{b_t}, W_{j_t}, \tau_{j_t}) = \frac{1}{1 + \exp(-l_t A_t)}$$

where $$A_t = x_{a_t}^T W_{j_t} x_{b_t} + \tau_{j_t}.$$

Within the Euclidian space, pairs of vectors with common pairwise activity (or otherwise strongly correlated) over the points in the Euclidian space are identified (318) as being in the same category, while points that do not have common pairwise activity (or are otherwise not strongly connected) are identified (318) as being in different categories. The joint distribution of the points within the Euclidian space describing the pairwise activity can be given as $$p(\Phi, V, Z, X, W, \tau, \mathcal{L}) = \prod_{k=1}^{\infty} p(V_k \mid \alpha) p(\Phi_k \mid m_0, \beta_0, J_0, \eta_0)$$

$$\prod_{i=1}^{N} p(z_i \mid V) p(x_i \mid \Phi_{z_i})$$

-continued $$\prod_{j=1}^{J} p(vecp\{W_j\} \mid \sigma_0^w) p(\tau_j \mid \sigma_0^\tau)$$

$$\prod_{t=1}^{T} p(l_t \mid x_{a_t}, x_{b_t}, W_{j_t}, \tau_{j_t})$$

where the conditional distributions are defined as $$p(V_k \mid \alpha) = \text{Beta}(V_k; 1, \alpha) \quad p(z_i = k \mid V) = V_k \prod_{i=1}^{k-1} (1 - V_i)$$

$$p(x_i \mid \Phi_{z_i}) = \text{Normal}\left(x_i; \mu_{z_i}, \sum_{z_i}\right) \quad p(x_i \mid \sigma_0^x) = \prod_d \text{Normal}([x_i]_d; 0, \sigma_0^x)$$

$$p(vecp\{W_j\} \mid \sigma_0^w) = \prod_{d_1 \leq d_2} \text{Normal}([W_j]_{d_1 d_2}; 0, \sigma_0^w) \quad p(\tau_j \mid \sigma_0^\tau) = \text{Normal}(\tau_j; 0, \sigma_0^\tau)$$

$$p(\Phi_k \mid m_0, \beta_0, J_0, \eta_0) = \text{Normal-Wishart}(\Phi_k; m_0, \beta_0, J_0, \eta_0)$$

and where $$(\sigma_0^x, \sigma_0^\tau, \sigma_0^w, \alpha, m_0, \beta_0, J_0, \eta_0)$$

are fixed hyper-parameters.

In a number of embodiments, the joint distribution is inferred using a Variational Bayes method with a proxy distribution $$q(\Phi, V, Z, X, W, \tau) = \prod_{k=K+1}^{\infty} p(V_k \mid \alpha) p(\Phi_k \mid m_0, \beta_0, J_0, \eta_0)$$

$$\prod_{k=1}^{K} q(V_k) q(\Phi_k) \prod_{i=1}^{N} q(z_i) q(x_i)$$

$$\prod_{j=1}^{J} q(vecp\{W_j\}) q(\tau_j)$$

With parametric distributions $$q(V_k) = \text{Beta}(V_h; \xi_{k,1}, \xi_{k,2}) \quad q(\Phi_k) = \text{Normal-Wishart}(m_k, \beta_k, J_k, \eta_k)$$

$$q(x_i) = \prod_d \text{Normal}([x_i]_d; [\mu_i^x]_d, [\sigma_i^x]_d) \quad q(\tau_j) = \text{Normal}(\tau_j; \mu_j^\tau, \sigma_j^\tau)$$

$$q(z_i = k) = q_{ik} \quad q(vecp\{W_j\}) = \prod_{d_1 \leq d_2} \text{Normal}([W_j]_{d_1 d_2}; [\mu_j^w]_{d_1 d_2}, [\sigma_j^w]_{d_1 d_2})$$

and variational parameters $$\{\xi_{k,1}, \xi_{k,2}\}$$

and $$\{m_k, \beta_k, J_k, \eta_k\}$$

associated with the k-th mixture component. $q(z_i = k) = q_{ik}$ is the factorized assignment distribution for the $i^{th}$ piece of source data with mean $\mu_i^x$ and variance $\sigma_i^x$ associated with the point in Euclidian space. Similarly, $\mu_j^w$ and $\sigma_j^w$ are the mean and variance for data categorization device j and $\mu_j^\tau$ and $\sigma_j^\tau$ are the mean and variance for the data categorization devices' bias $\tau_j$. The variational parameters can be determined utilizing a variety of functions as appropriate to the requirements of specific applications in accordance with embodiments of the invention, including Jensen's inequality. Using Jensen's inequality, $$\log p(\mathcal{L} \mid \sigma_0^x, \sigma^0_\tau, \sigma^0_w, \alpha, m_0, \beta_0, J_0, \eta_0) \geq E_q \log p(\Phi, V, Z, X, W, \tau, \mathcal{L}) + \mathcal{H}\{q(\Phi, V, Z, X, W, \tau)\}$$

with entropy $$\mathcal{H}\{q(\Phi, V, Z, X, W, \tau)\}$$

and Free Energy $$E_q \log p(\Phi, V, Z, X, W, \tau, \mathcal{L}) + \mathcal{H}\{q(\Phi, V, Z, X, W, \tau)\}$$

The Free Energy can be approximated using a variety of distributions, including the unnormalized Gaussian function $$g(\Delta_t)\exp\{(l_t A_t - \Delta_t)/2 + \lambda(\Delta_t)(A_t^2 - \Delta_t^2)\} \leq p(l_t | x_{a_t}, x_{b_t}, W_{j_t}, \tau_{j_t})$$

where $$g(x) = (1+e^{-x})^{-1} \text{ and } \lambda(\Delta) = [\tfrac{1}{2} - g(\Delta)]/(2\Delta).$$

This results in the utility function $$\mathcal{F} = E_q \log p(\Phi, V, Z, X, W, \tau) + \mathcal{H}\{q(\Phi, V, Z, X, W, \tau)\} + \sum_t \log g(\Delta_t) + \frac{l_t}{2} E_q\{A_t\} - \frac{\Delta_t}{2} + \lambda(\Delta_t)(E_q\{A_t^2\} - \Delta_t^2)$$

describing the number of clusters of points in Euclidian space and, thereby, the identified (318) categories of source data based on the generated (316) subset clusters. Although a specific set of distributions and utility functions have been described above, a variety of distributions and utility functions, such as Gaussian mixture models, exponential distributions, Monte Carlo techniques, variational inference, and/or other techniques that enforce a scale for a latent space such that the points in space can be regularized and/or categorized (e.g. clustered) can be utilized as appropriate to the requirements of specific applications in accordance with embodiments of the invention.

In several embodiments, identifying (318) categories within the generated (316) subset clusters by identifying the boundaries between subset clusters. Identifying the boundaries between subset clusters includes observing the centroids of the generated (316) subset clusters and then selecting samples in the Euclidean space along the lines intersecting the centroids of the subset clusters and determining sets of points along (or near to) the line. Based on the similarity and/or differences of the identified points, the edges and boundaries of the subset clusters can be identified; the categories (318) are then identified based on the boundaries of the subset clusters. In a number of embodiments, the boundary determination is performed iteratively and refined as additional points are added to the Euclidean space and additional subset clusters and boundaries of subset clusters are identified. In many embodiments, metadata is associated with the subset clusters (and/or pieces of source data within the subset clusters) indicating the properties used to place the particular pieces of source data within a particular subset cluster is used to identify (318) the categories. This metadata can be provided a data categorization device and/or be determined based on the similarities and/or differences between pieces of source data within a subset cluster or between multiple subset clusters.

Category Refinement

In a number of embodiments, once the categories have been identified (318), finer categorical distinctions exist in the pieces of source data associated with an identified (318) category. When it is desirable to identify these finer categorical distinctions, the categories can be refined (320). In many embodiments, categories are refined (320) based on attributes of the pieces of source data that are not described by the identified (318) categories. In a variety of embodiments, categories are refined (320) based on the number of pieces of data associated with an identified (318) category. In several embodiments, one or more of the clusters are clearly defined in Euclidean space, resulting in easily identified (318) categories. In other clusters, in particular larger clusters, it is likely that there are several clusters present. These clusters within the larger cluster indicate the presence of sub-categories that can be refined (320) based on the initially identified (318) cluster. In a variety of embodiments, metrics related to the distribution of the samples around the centroid of a cluster are utilized to determine whether to attempt to further refine (320) a cluster to identify the sub-categories within the original cluster.

Although specific processes for the distributed categorization of source data are discussed above with respect to FIG. 3, any of a variety of processes, including those utilizing distributions differing from those described above, can be performed in accordance with embodiments of the invention. Processes for determining subsets of source data for distribution to and the characterization of data categorization devices in accordance with embodiments of the invention are discussed below.

Determining Subsets of Source Data

Figure 4:
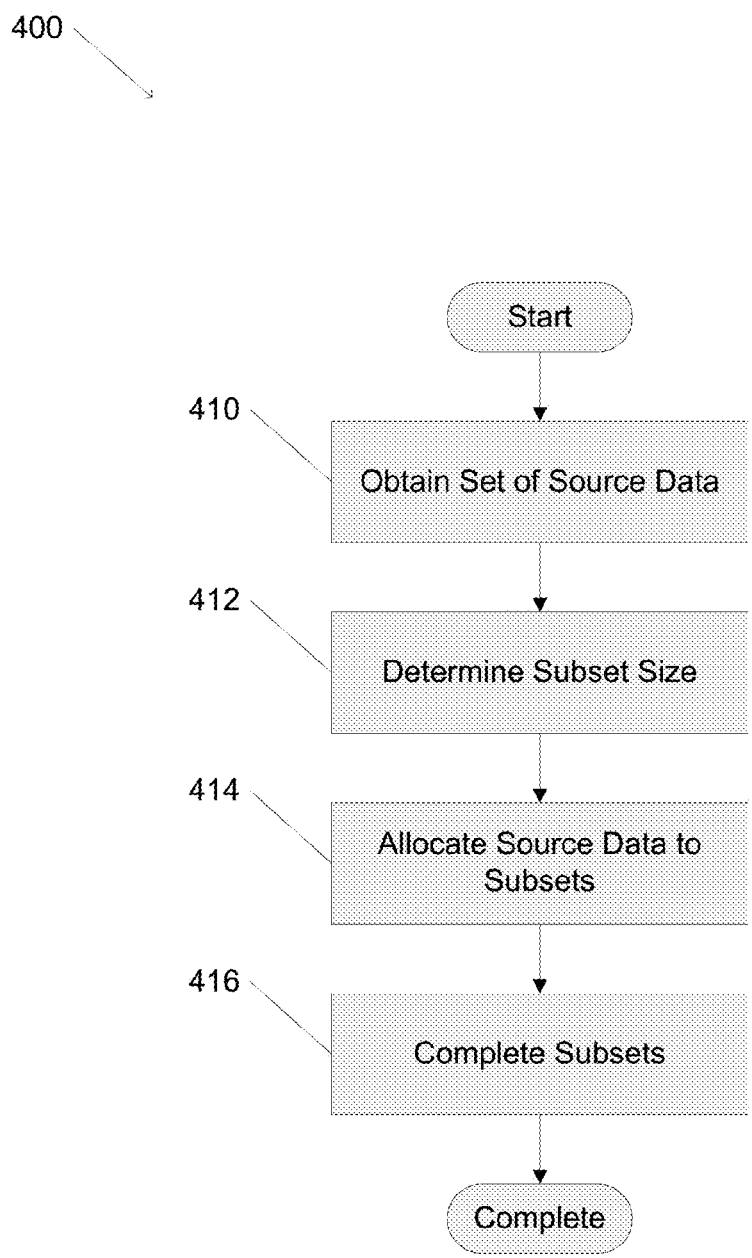
FIG. 4 is a flow chart conceptually illustrating a process for determining subsets of source data in accordance with an embodiment of the invention.

For a large set of source data, it may be impractical to analyze the entire set of source data at once in order to determine categories describing the pieces of source data in the set. By analyzing subsets of the set of source data, categories for the pieces of source data can be determined based on categories determined for the subsets. However, the subsets of source data need to be constructed carefully to ensure that sufficient overlap exists between subsets so that the subsets can be combined to determine categories for the whole while ensuring that every piece of source data is categorized. A process for determining subsets of source data for a set of source data in accordance with an embodiment of the invention is conceptually illustrated in FIG. 4. The process 400 includes obtaining (410) a set of source data. A subset size is determined (412) and source data is allocated (414) to the subsets. The subsets are completed (416).

In many embodiments, the set of source data is obtained (410) utilizing processes similar to those described above. The subset size is determined (412) such that a subset is smaller than the obtained (410) set. In a variety of embodiments, the subset size is determined (412) based on the capabilities of a data categorization device. The obtained (410) source data is allocated (414) deterministically to the subsets in a manner such that each piece of source data occurs in at least one subset and the subsets have an overlap in the pieces of source data allocated across all the subsets. In cases where the determined (412) subset size exceeds the allocated (414) pieces of source data, a subset is completed (416) by allocating additional pieces of source data within the set of source data that have not already been allocated (414) to the subset. In several embodiments, the completion (416) of a subset includes sampling without replacement from the set of source data.

By way of example, take set of N pieces of source data distributed into subsets having M pieces of source data in each subset. The N pieces of source data are allocated (414) across the subsets such that each subset contains $$\left\lceil \frac{M}{V} \right\rceil$$

pieces of source data. The subsets are completed (416) by filling in the remaining $$M - \left\lceil \frac{M}{V} \right\rceil$$

pieces of source data for each subset by sampling without replacement from the $$N - \left\lceil \frac{M}{V} \right\rceil$$

pieces of source data that have not been allocated (414) to the subset. If R data categorization devices annotate each subset of source data, the total number of categorization tasks that need to be completed by data categorization devices is $$H = R \left\lceil \frac{NV}{M} \right\rceil.$$

This results in $$T = R \left\lceil \frac{NV}{M} \right\rceil \binom{M}{2} \in O(RNVM)$$

binary labels being applied as annotations to the pieces of source data.

Although a specific process for determining subsets of a set of source data is described above with respect to FIG. 4, a variety of processes, including those that utilize alternative sampling schemes, can be performed in accordance with embodiments of the invention. Processes for modeling the characteristics of data categorization devices in accordance with embodiments of the invention are discussed below.

Modeling Data Categorization Devices

Figure 5:
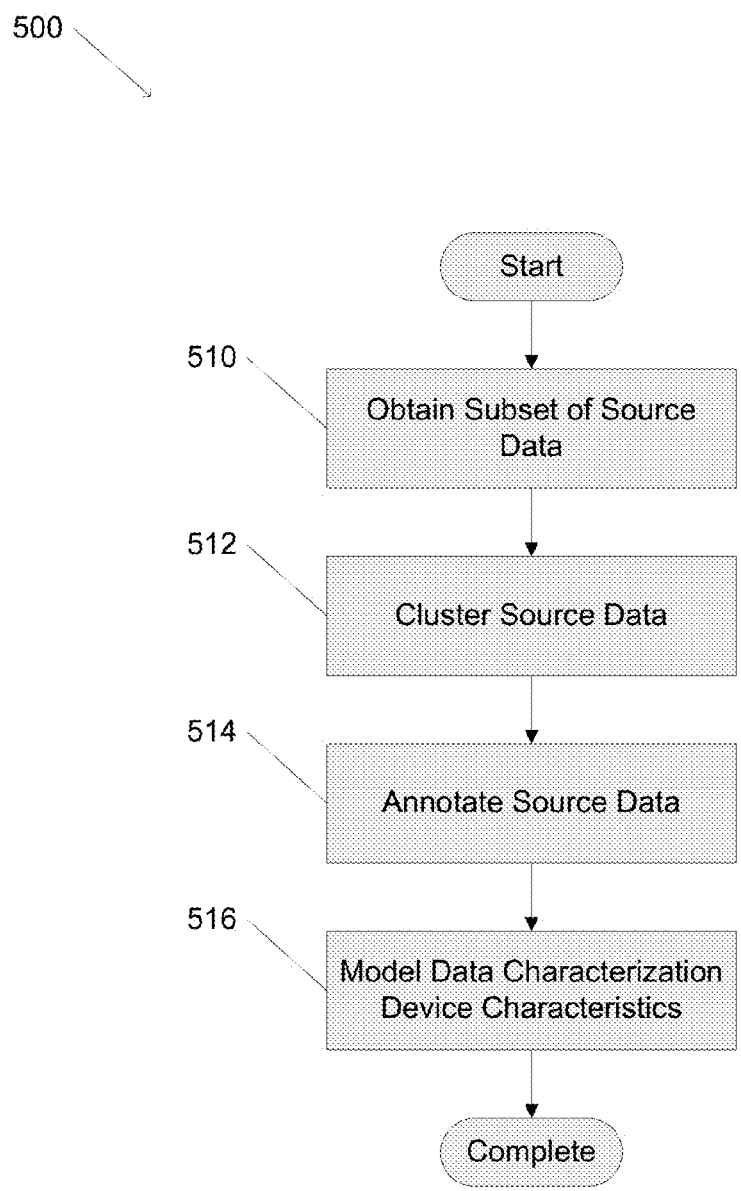
FIG. 5 is a flow chart conceptually illustrating a process for modeling worker behavior in the categorization of source data in accordance with an embodiment of the invention.

A variety of attributes of a piece of source data can be utilized to cluster and categorize the piece of source data. Different data categorization devices employ different categorization criteria in the clustering of source data assigned to the data categorization device. These categorization criteria can lead data categorization devices to perform better or worse than other data categorization devices based on the attributes of the source data being categorized. By modeling the characteristics of the data categorization devices, source data can be targeted towards particular data categorization devices in order to improve the overall performance of the data categorization process. A process for annotating pieces of source data in accordance with an embodiment of the invention is conceptually illustrated in FIG. 5. The process 500 includes obtaining (510) a subset of source data. The source data is clustered (512) and annotated (514). In a variety of embodiments, characteristics of a data categorization device are modeled (516).

In a variety of embodiments, the subset of source data is obtained (510), clustered (512), and/or annotated (514) utilizing processes similar to those described above. In several embodiments, modeling (516) the characteristics of a data categorization device j include determining a predicted confusion matrix $C_j$ where $$[C_j]_{k_1 k_2} = E_q \{ \int p(l=1 | x_a, x_b, W_j, \tau_j) p(x_a | \Phi_{k_1}) p(x_b | \Phi_{k_2}) \, dx_a dx_b \}$$

and the predicted confusion matrix expresses the probability that the data categorization device j will assign source data $k_1$ and $k_2$ in the obtained (510) subset of source data to the same cluster (512). For the variational distributions $\Phi(k_1)$ and $\Phi(k_2)$, the expected values $$E\{\Phi_{k_1}\} = \{m_{k_1}, J_{k_1}/\eta_{k_1}\}$$

and $$E\{\Phi_{k_2}\} = \{m_{k_2}, J_{k_2}/\eta_{k_2}\}$$

results in the approximate confusion matrix $$[\hat{C}_j]_{k_1 k_2} = g(\hat{\Delta}_{k_1 k_2 j}) \exp\{(m_{k_1}^T \mu_j^w m_{k_2} + \mu_j^\tau - \hat{\Delta}_{k_1 k_2 j})/2\}$$

that can be utilized in a variety of embodiments of the invention.

A specific process for annotating source data and modeling the characteristics for a data categorization device is described above with respect to FIG. 5; however, a variety of processes, including those that utilize alternative clustering techniques, can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for labeling a set of source data, comprising:
   obtaining a set of source data using a distributed data categorization server system comprising a processor and a memory connected to the processor;
   determining a plurality of subsets of the source data using the distributed data categorization server system, where a subset of the source data comprises a plurality of pieces of source data in the set of source data;
   obtaining sets of pairwise annotations for each subset of source data using the data categorization server system, where a pairwise annotation indicates when a first piece of source data in a subset of source data is similar to a second piece of source data in the subset of source data;
   identifying a category for each subset of source data based on the obtained pairwise annotations for the subset of source data using the distributed data categorization server system;
   locating pieces of source data located in at least two of the subsets of source data using the data categorization server system;
   generating source data metadata describing attributes for at least one of the located pieces of source data based on the categories assigned to each of the subsets of source data in which the located pieces of content are contained using the data categorization server system, where the source data metadata for a piece of source data describes attributes of the piece of source data; and generating a taxonomy based on the identified categories and the set of source data using the distributed data categorization server system, where the taxonomy comprises relationships between the identified categories and the pieces of source data in the set of source data.

2. The method of claim 1, wherein a category in the taxonomy comprises one or more attributes of the pieces of source data associated with the category in the taxonomy.

3. The method of claim 1, further comprising iteratively identifying sub-categories for at least one identified category based on the pieces of source data associated with the identified category using the distributed data categorization server system.

4. The method of claim 3, wherein:
the at least one identified category is selected based on the attributes of the pieces of source data associated with the identified category; and
the identified sub-categories comprise at least one attribute from a piece of source data associated with the sub-category that is not present in the identified category.

5. The method of claim 1, further comprising generating instruction data using the distributed data categorization server system, where the instruction data describes the attributes of the pieces of the source data that should be used in generating the set of pairwise annotations.

6. The method of claim 5, wherein the instruction data is generated based on the attributes of the pieces of source data in the set of source data.

7. The method of claim 1, wherein generating a set of pairwise annotations for the pieces of source data in each subset of source data using the distributed data categorization server system is based on data characterization device metadata, where the data characterization device metadata describes anticipated annotations based on the pieces of source data in the obtained subset of source data.

8. The method of claim 1, wherein clustering the set of source data into related subsets of source data further comprises:
generating a model comprising a set of points representing the pieces of source data in a Euclidian space using the distributed data categorization server system; and
clustering the set of points within the Euclidian space based on the set of pairwise annotations using the distributed data categorization server system.

9. The method of claim 8, further comprising estimating the number of clusters within the Euclidian space using the distributed data categorization server system.

10. The method of claim 1, wherein determining a plurality of subsets further comprises:
determining a subset size using the distributed data categorization server system, where the subset size is a measure of the number of pieces of source data assigned to a subset; and
deterministically allocating the pieces of source data to the determined subsets using the distributed data categorization server system.

11. The method of claim 10, further comprising allocating additional pieces of source data to the subsets using the distributed data categorization server system, where the additional pieces of source data are sampled without replacement from the set of source data not already assigned to the subset.

12. A distributed data categorization server system, comprising:
a processor; and
a memory connected to the processor and storing a data categorization application;
wherein the data categorization application directs the processor to:
obtain a set of source data;
determine a plurality of subsets of the source data, where a subset of the source data comprises a plurality of pieces of source data in the set of source data;
obtain a set of pairwise annotation for each subset of source data, where a pairwise annotation indicates when a first piece of source data in a subset of source data is similar to a second piece of source data in the subset of source data;
identify a category for each subset of source data based on the obtained pairwise annotations for the subset of source data;
locate pieces of content contained in at least two of the subsets of source data;
generate label data for each of the located pieces of content based on the categories assigned to each of the subsets of source data in which the located pieces of content are contained; and
generate a taxonomy based on the identified categories and the set of source data, where the taxonomy comprises relationships between the identified categories and the pieces of source data in the set of source data.

13. The system of claim 12, wherein a category in the taxonomy comprises one or more attributes of the pieces of source data associated with the category in the taxonomy.

14. The system of claim 12, wherein the data categorization application further directs the processor to iteratively identify sub-categories for at least one identified category based on the pieces of source data associated with the identified category.

15. The system of claim 14, wherein:
the at least one identified category is selected based on the attributes of the pieces of source data associated with the identified category; and
the identified sub-categories comprise at least one attribute from a piece of source data associated with the sub-category that is not present in the identified category.

16. The system of claim 12, wherein the data categorization application further directs the processor to generate instruction data, where the instruction data describes the attributes of the pieces of the source data that should be used in generating the set of pairwise annotations.

17. The system of claim 16, wherein the instruction data is generated based on the attributes of the pieces of source data in the set of source data.

18. The system of claim 12, wherein generating a set of pairwise annotations for the pieces of source data in each subset of source data using the distributed data categorization server system is based on data characterization device metadata, where the data characterization device metadata describes anticipated annotations based on the pieces of source data in the obtained subset of source data.

* * * * *